US012164187B2

(12) United States Patent
Li et al.

(10) Patent No.: US 12,164,187 B2
(45) Date of Patent: Dec. 10, 2024

(54) DISPLAY SUBSTRATE AND DISPLAY PANEL IN EACH OF WHICH DISTANCE FROM CONVEX STRUCTURE TO A SUBSTRATE AND DISTANCE FROM ALIGNMENT LAYER TO THE SUBSTRATE HAS PRESET DIFFERENCE THEREBETWEEN

(71) Applicants: Ordos Yuansheng Optoelectronics Co., Ltd., Inner Mongolia (CN); BOE Technology Group Co., Ltd., Beijing (CN)

(72) Inventors: Kai Li, Beijing (CN); Feng Li, Beijing (CN); Yezhou Fang, Beijing (CN); Xinguo Wu, Beijing (CN); Lei Yao, Beijing (CN); Chenglong Wang, Beijing (CN); Zhixuan Guo, Beijing (CN); Lei Yan, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 597 days.

(21) Appl. No.: 17/439,917

(22) PCT Filed: Jan. 21, 2021

(86) PCT No.: PCT/CN2021/073004
§ 371 (c)(1),
(2) Date: Sep. 16, 2021

(87) PCT Pub. No.: WO2021/147936
PCT Pub. Date: Jul. 29, 2021

(65) Prior Publication Data
US 2022/0252926 A1    Aug. 11, 2022

(30) Foreign Application Priority Data

Jan. 23, 2020    (CN) .......................... 202010076456.1

(51) Int. Cl.
*G02F 1/13*          (2006.01)
*G02F 1/1333*        (2006.01)
(Continued)

(52) U.S. Cl.
CPC .... *G02F 1/133345* (2013.01); *G02F 1/13394* (2013.01); *G02F 1/134336* (2013.01);
(Continued)

(58) Field of Classification Search
CPC ........... G02F 1/133345; G02F 1/13394; G02F 1/134336; G02F 1/136227; G02F 1/1368;
(Continued)

(56) References Cited

U.S. PATENT DOCUMENTS 5,499,128 A      3/1996  Hasegawa et al.
10,197,857 B2 *  2/2019  Kunimatsu ....... G02F 1/133723
(Continued)

FOREIGN PATENT DOCUMENTS

CN    103676333 A    3/2014
CN    205827023 U   12/2016
(Continued)

*Primary Examiner* — Mohammad M Hoque
(74) *Attorney, Agent, or Firm* — Nath, Goldberg & Meyer; Joshua B. Goldberg

(57) ABSTRACT

Embodiments of the present disclosure provide a display substrate and a display panel. The display substrate has a light-transmissive region and a light-shielding region, and the light-shielding region includes a main support region and a secondary support region. The display substrate includes a substrate, an alignment layer on the substrate, and a convex structure on the alignment layer. The convex structure is on a side of the alignment layer distal to the substrate and at
(Continued)

least in the main support region, and a distance from a surface of the convex structure distal to the substrate to the substrate is greater than a distance from a surface of the alignment layer distal to the substrate to the substrate.

19 Claims, 5 Drawing Sheets

(51) Int. Cl.
*G02F 1/1339* (2006.01)
*G02F 1/1343* (2006.01)
*G02F 1/1362* (2006.01)
*G02F 1/1368* (2006.01)

(52) U.S. Cl.
CPC ...... *G02F 1/136227* (2013.01); *G02F 1/1368* (2013.01); *G02F 2201/503* (2013.01)

(58) Field of Classification Search
CPC ......... G02F 2201/503; G02F 1/133512; G02F 1/1337; G02F 1/13396; G02F 2201/50; G02F 2201/501; G02F 1/133514; G02F 1/1362; G02F 1/136209

USPC .......................................................... 257/72
See application file for complete search history.

(56) References Cited

U.S. PATENT DOCUMENTS

| | | |
|---|---|---|
| 2015/0253607 A1 | 9/2015 | Cho |
| 2015/0253608 A1 | 9/2015 | Cho |
| 2017/0184900 A1* | 6/2017 | Jang ..................... G02F 1/13394 |
| 2018/0257974 A1* | 9/2018 | Deng .................. G02F 1/13392 |
| 2018/0284515 A1* | 10/2018 | Higano ............. G02F 1/136286 |
| 2018/0321534 A1* | 11/2018 | Koppal ................. G02F 1/1337 |

FOREIGN PATENT DOCUMENTS

| | | |
|---|---|---|
| CN | 106483718 A | 3/2017 |
| CN | 107329311 A | 11/2017 |
| CN | 107357100 A | 11/2017 |
| CN | 110262137 A | 9/2019 |
| CN | 110579910 A | 12/2019 |
| CN | 211741792 U | 10/2020 |

* cited by examiner

DISPLAY SUBSTRATE AND DISPLAY PANEL IN EACH OF WHICH DISTANCE FROM CONVEX STRUCTURE TO A SUBSTRATE AND DISTANCE FROM ALIGNMENT LAYER TO THE SUBSTRATE HAS PRESET DIFFERENCE THEREBETWEEN

CROSS REFERENCE TO RELATED APPLICATIONS

This is a National Phase Application filed under 35 U.S.C. 371 as a national stage of PCT/CN2021/073004, filed Jan. 21, 2021, an application claiming priority to Chinese patent application No. 202010076456.1, filed on Jan. 23, 2020, the content of each of which is incorporated herein by reference in its entirety.

TECHNICAL FIELD

The present disclosure relates to the field of display technology, and in particular to a display substrate and a display panel.

BACKGROUND

With increasing demand of a user on a high display resolution of an augmented reality (AR) product and/or a virtual reality (VR) product, refined design and manufacturing processes are inevitable trends for development of a display substrate, and the design and manufacturing processes of the display substrate will in turn have a direct influence on a quality of a final product. Meanwhile, a large change in environmental temperature and an impact of external force on a product will have a negative influence on a display quality of the product. Therefore, the requirements on a manufacturing process and a display effect of the display substrate are increased. At present, design methods for a post spacer (which may be simply referred to as PS) of the AR product and/or the VR product includes a method of disposing a post spacer on a color filter substrate (i.e., PS on CF) and a method for disposing a post spacer on an array substrate (i.e., PS on Array).

SUMMARY

A first aspect of the present disclosure provides a display substrate having a light-transmissive region and a light-shielding region, the light-shielding region including a main support region and a secondary support region; and
    the display substrate including a substrate, an alignment layer on the substrate, and a convex structure on the alignment layer;
    wherein the convex structure is on a side of the alignment layer distal to the substrate, does not completely cover the alignment layer, and is at least in the main support region, and a distance from a surface of the convex structure distal to the substrate to the substrate is greater than a distance from a surface of the alignment layer distal to the substrate to the substrate.

In an embodiment, the main support region and the secondary support region are in two pixels of the display substrate, respectively.

In an embodiment, the two pixels are adjacent to each other.

In an embodiment, the two pixels are spaced apart from each other by at least one pixel.

In an embodiment, the convex structure is in both the main support region and the secondary support region, and convex structures in main support regions and secondary support regions in a same row of a pixel array of the display substrate have a one-piece structure.

In an embodiment, the display substrate includes an array substrate.

In an embodiment, the display substrate further includes:
    a switching transistor on the substrate and in the light-shielding region;
    a display electrode on the substrate and in the light-transmissive region; and
    an interlayer insulating layer between the switching transistor and the display electrode, wherein
    a drain electrode of the switching transistor is connected to the display electrode through a through hole penetrating through the interlayer insulating layer;
    the alignment layer is on a side of the display electrode distal to the substrate; and
    the convex structure covers the through hole in the main support region, and has a filling part in the through hole.

In an embodiment, convex structures in main support regions and secondary support regions in a same row of a pixel array of the display substrate have a one-piece structure.

In an embodiment, the display substrate includes a color filter substrate.

In an embodiment, a difference between the distance from the surface of the convex structure distal to the substrate to the substrate and the distance from the surface of the alignment layer distal to the substrate to the substrate is between 0.3 μm and 1.3 μm.

In an embodiment, the convex structure includes a material of a resin.

In an embodiment, the resin is acrylic resin.

A second aspect of the present disclosure provides a display panel, which includes the display substrate according to any one of the foregoing embodiments of the first aspect of the present disclosure.

In an embodiment, in a case where the display substrate is an array substrate, the display panel further includes a color filter substrate;
    the color filter substrate includes a main post spacer and an secondary post spacer; and
    the main post spacer is in contact with the convex structure in the main support region of the display substrate.

In an embodiment, in a direction perpendicular to the array substrate or the color filter substrate, the main post spacer overlaps the main support region, and the secondary post spacer overlaps the secondary support region.

In an embodiment, in a direction perpendicular to the array substrate or the color filter substrate, a size of the main post spacer is greater than that of the secondary post spacer.

In an embodiment, the convex structure of the array substrate has a gap therein, and the gap divides the convex structure into separate parts; and
    in a direction perpendicular to the array substrate or the color filter substrate, a size of the main post spacer is equal to that of the secondary post spacer, and an orthogonal projection of the secondary post spacer on the convex structure is in the gap.

In an embodiment, in a case where the display substrate is a color filter substrate, the display panel further includes an array substrate, the array substrate includes a main post spacer and a secondary post spacer, the main post spacer is in contact with the convex structures in the main support region of the display substrate, and the secondary post spacer overlaps the secondary support region of the display substrate.

In an embodiment, the array substrate includes a switching transistor in the light-shielding region, a display electrode in the light-transmissive region, and an interlayer insulating layer between the switching transistor and the display electrode;

drain electrodes of two switching transistors are respectively connected to two display electrodes through two through holes penetrating through the interlayer insulating layer; and in a direction perpendicular to the array substrate or the color filter substrate, orthogonal projections of the main post spacer and the secondary post spacer on the interlayer insulating layer completely cover the two through holes, respectively.

In an embodiment, the display panel is an AR display panel or a VR display panel.

DETAILED DESCRIPTION

Figure 1:
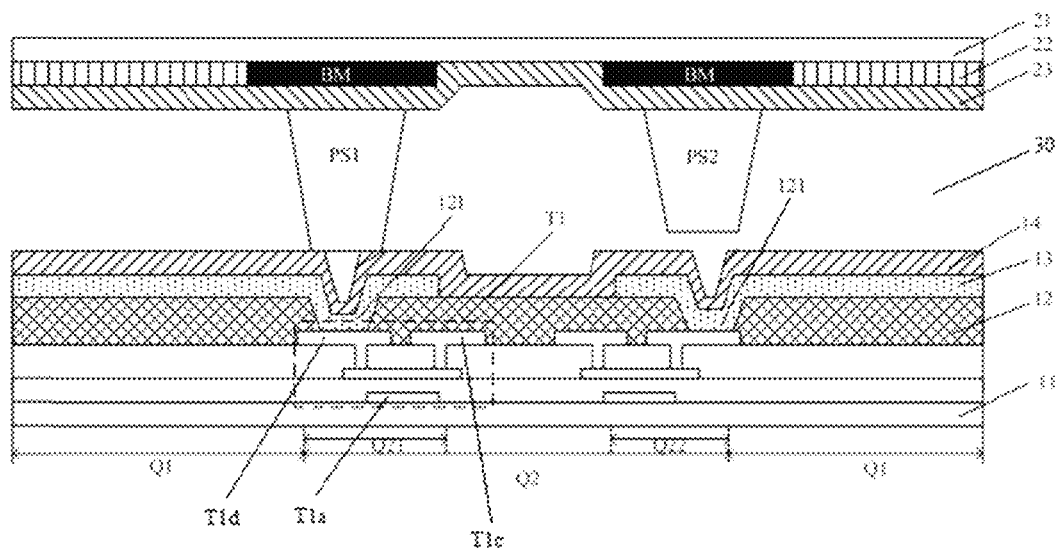
FIG. 1 is a schematic structural diagram of a part (i.e., two pixels) of a liquid crystal panel according to an embodiment of the present disclosure.

To enable one of ordinary skill in the art to better understand technical solutions of the present disclosure, the technical solutions of the present disclosure will be described in further detail below with reference to the accompanying drawings and exemplary embodiments.

Unless defined otherwise, technical or scientific terms used herein should have the same meaning as commonly understood by one of ordinary skill in the art to which the present disclosure belongs. The terms of "first", "second", and the like used herein are not intended to indicate any order, quantity, or importance, but rather are used for distinguishing one element from another. For example, a "first element" and a "second element" In an embodiment may be referred to as a "second element" and a "first element," respectively, in another embodiment. Further, the term "a", "an", "the", or the like does not denote a limitation of quantity, but rather denotes the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The inventors of the present inventive concept have found that, both the existing method of disposing a post spacer on a color filter substrate (i.e., PS on CF) and the existing method for disposing a post spacer on an array substrate (i.e., PS on Array) have a phenomenon (which may be referred to as "PS Mura" hereinafter) that a display substrate formed by an array substrate and a color filter substrate has ripples (i.e., Mura) with non-uniform brightnesses related to a PS because the array substrate and the color filter substrate are offset relative to each other when being aligned and assembled into a cell, and have defects of light leakage and the like. The PS Mura occurs mainly because a liquid crystal panel is impacted by an external force. Specifically, when the liquid crystal panel has an insufficient strength, the liquid crystal panel may have an irrecoverable color spot after being impacted by the external force, thereby having the PS Mura.

The display substrate according to an embodiment of the present disclosure may be applied to a liquid crystal panel, and for example, the liquid crystal panel may be an AR display panel or a VR display panel. For example, the display substrate according to an embodiment of the present disclosure may be an array substrate, a COA (Color On Array substrate, i.e., a substrate on which a color filter is provided on the array substrate), or a color filter substrate. The following exemplary embodiments will be described by taking examples in which the display substrate is an array substrate and a color filter substrate, respectively, but an embodiment of the present disclosure is not limited thereto. For example, in a case where the display substrate is an array substrate, a substrate in the display substrate may be referred to as a first substrate, and an alignment layer therein may be referred to as a first alignment layer. In a case where the display substrate is a color filter substrate, a substrate in the display substrate may be referred to as a second substrate, and an alignment layer therein may be referred to as a second alignment layer.

As shown in FIG. 1, an exemplary liquid crystal panel may include a light-shielding region Q2 and a light-transmissive region Q1. The liquid crystal panel may include an array substrate (e.g., including components indicated by reference numerals "11", "12", "13", and "14" in FIG. 1) and a color filter substrate (e.g., including components indicated by reference numerals "21", "22", and "23" in FIG. 1) opposite to each other, a liquid crystal layer 30 disposed between the array substrate and the color filter substrate, and post spacers (which may be simply referred to as PS and may include a main post spacer PS1 and a secondary post spacer PS2 shown in FIG. 1) for maintaining a thickness (e.g., a size of the liquid crystal layer 30 in a direction perpendicular to the array substrate or the color filter substrate (e.g., a vertical direction in FIG. 1)) of the liquid crystal layer 30 between the array substrate and the color filter substrate.

For example, the array substrate may include a first substrate 11, and a plurality of gate lines and a plurality of data lines (not shown) disposed on the first substrate 11. The plurality of gate lines may cross the plurality of data lines, respectively, to define a plurality of pixel units in a manner known in the art. The plurality of pixel units may form an array including a plurality of rows and a plurality of columns. For example, each pixel unit at least includes a pixel driving circuit and a display electrode, and a first alignment layer 14 is arranged on a side of the display electrode distal to the first substrate 11.

Specifically, the pixel driving circuit is located in the light-shielding region Q2, and includes at least a switching transistor (e.g., a thin film transistor) T1. In addition, gate electrodes T1a of switching transistors T1 in pixel driving circuits in a same row are connected to a same gate line, and source electrodes T1c of switching transistors T1 in a same column are connected to a same data line. The display electrode is located in the light-transmissive region Q1, and may be a pixel electrode 13, or a common electrode located on the color filter substrate (e.g., the common electrode may be located between a color filter 22 and a second alignment layer 23 of the color filter substrate and is not shown in the figure). An embodiment of the present disclosure is described by taking an example in which the display electrode is the pixel electrode 13. An interlayer insulating layer 12 is provided between a layer where a drain electrode T1d of the switching transistor T1 of each pixel driving circuit is located and a layer where the pixel electrode 13 is located. In each pixel unit, the drain T1d of the switching transistor T1 is connected to the pixel electrode 13 through a through hole 121 penetrating through the interlayer insulating layer 12, so as to provide a data voltage to the pixel electrode 13, such that an electric field is formed between the pixel electrode 13 and the common electrode on the color filter substrate, for driving liquid crystal molecules of the liquid crystal layer 30 in the liquid crystal panel to rotate, thereby realizing display of different gray scales.

For example, the color filter substrate may include a second substrate 21, color filters 22 (which may include a red filter, a green filter, and a blue filter) on a side of the second substrate 21 proximal to the liquid crystal layer 30, a black matrix BM between adjacent color filters 22, and a second alignment layer 23 disposed on a side, which is distal to the second substrate 21 (which is proximal to the liquid crystal layer 30), of a layer where the color filters 22 and the black matrix BM are located.

For example, each color filter 22 may be positioned in the light-transmissive region Q1 of the liquid crystal panel, and the black matrix BM may be positioned in the light-shielding region Q2 of the liquid crystal panel.

For example, the post spacers may be located between the array substrate and the color filter substrate, and located in the light-shielding region Q2. The post spacers may include a main post spacer PS1 and a secondary post spacer PS2. In the present embodiment, a region in which the main post spacer PS1 is provided is defined as a main support region Q21, and a region in which the secondary post spacer PS2 is provided is defined as a secondary support region Q22. In other words, the light-shielding region Q2 includes the main support region Q21 and the secondary support region Q22. The main post spacer PS1 is for maintaining a thickness of the liquid crystal layer 30, so the main post spacer PS1 is in contact with the array substrate and the color filter substrate, respectively. The secondary post spacer PS2 has a buffering function when the liquid crystal panel is subjected to an external force, so the secondary post spacer PS2 is in contact with only one of the array substrate and the color filter substrate while has a certain distance from (i.e., is not in contact with) the other of the array substrate and the color filter substrate. For example, in the embodiment of FIG. 1, the secondary post spacer PS2 is in contact with only the color filter substrate, and has a certain distance from (i.e. is not in contact with) the array substrate. The post spacers of the liquid crystal panel may be arranged in a plurality of rows, and for example, the post spacers in each row may be arranged along a direction in which the gate lines extend. Alternatively, the post spacers may be arranged in a direction in which the data lines extend. The post spacers in each row include a main post spacer PS1 and a secondary post spacer PS2 which may be arranged alternately. For example, the main support region and the secondary support region are located in two pixels of a display device, respectively, and the two pixels may be adjacent to each other or may be spaced apart from each other by at least one pixel. In other words, the main post spacer PS1 or the secondary post spacer PS2 may be provided in each pixel unit, or the main post spacer PS1 and the secondary post spacer PS2 may be provided in two pixel units of every N pixel units, respectively, where N is an integer greater than or equal to 3. The main post spacer PS1 and the secondary post spacer PS2 may be arranged adjacent to each other or spaced apart from each other. The main post spacer PS1 and the secondary post spacer PS2 may be arranged uniformly or non-uniformly.

The inventors of the present inventive concept have found that, when the liquid crystal panel shown in FIG. 1 is subjected to an external force, the main post spacer PS1 may be misaligned, thereby scratching the first alignment layer 14, causing the liquid crystal panel to be damaged, and causing display defects such as light leakage. For example, in a case where the main post spacer PS1 and the secondary post spacer PS2 are formed on the color filter substrate, the main post spacer PS1 may be misaligned when the liquid crystal panel is subjected to an external force, such that the first alignment layer 14 of the array substrate may be scratched, thereby scratching the liquid crystal panel and causing display defects such as light leakage.

In order to solve at least the above problems, other embodiments of the present disclosure provide the following technical solutions.

In a first aspect, an embodiment of the present disclosure provides a display substrate having the light-transmissive region and the light-shielding region, and the light-shielding region includes the main support region and the secondary support region. The display substrate includes a substrate, an alignment layer arranged on the substrate, and a convex structure which is arranged on a side of the alignment layer distal to the substrate, does not completely cover the alignment layer and is at least positioned in the main support region. A distance between a surface of the convex structure distal to the substrate and the substrate is greater than a distance between a surface of the alignment layer distal to the substrate and the substrate.

Since the display substrate according to the present embodiment includes the convex structure, and the distance between the surface of the convex structure distal to the substrate and the substrate is greater than the distance between the surface of the alignment layer distal to the substrate and the substrate. As such, even if a liquid crystal panel including the display substrate is subjected to an external force to cause the main post spacer thereof to be misaligned, a part of the alignment layer in the light-transmissive region will not be scratched by the main post spacer due to a certain height difference between the convex structure and the alignment layer, thereby effectively avoiding the generation of a poor display effect. Further, since the convex structure does not completely cover the alignment layer, the alignment layer may normally adjust the orientation of the liquid crystal molecules in the liquid crystal layer 30.

Figure 2:
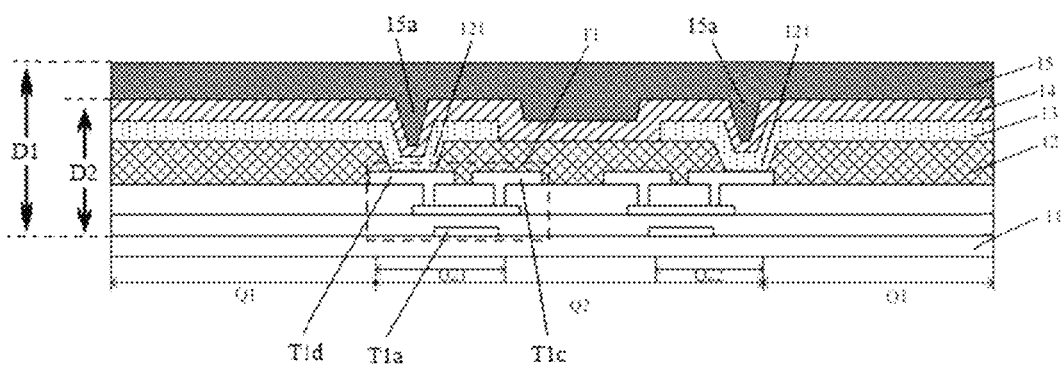
FIG. 2 is a schematic structural diagram of a part (i.e., two pixels) of an array substrate (i.e., a display substrate) according to an embodiment of the present disclosure.
Figure 3:
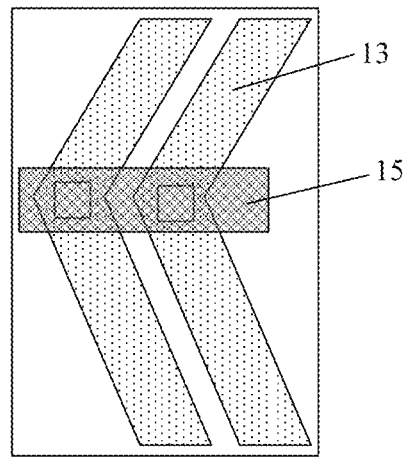
FIG. 3 is a schematic top view of the array substrate shown in FIG. 2.

In an example, as shown in FIGS. 2 and 3, the display substrate is an array substrate having a light-shielding region (e.g., a region where the switching transistor T1 is located in each pixel) Q2 and a light-transmissive region (e.g., a part of each pixel other than the region where the switching transistor T1 is located) Q1. The array substrate may further include a first substrate 11, a switching transistor T1 located on the first substrate 11 and in the light-shielding region Q2, a pixel electrode 13 located on the switching transistor T1 and in the light-transmissive region Q1, a first alignment layer 14 disposed on the pixel electrode 13, and an interlayer insulating layer 12 located between the switching transistor T1 and the pixel electrode 13. The drain electrode T1d of the switching transistor T1 is connected to the pixel electrode 13 through a through hole 121 penetrating the interlayer insulating layer 12. The light-shielding region Q2 includes a main support region (e.g., a region where the switching transistor T1 is located in a pixel) Q21 and a secondary support region (e.g., a region where the switching transistor T1 is located in another pixel) Q22. The array substrate further includes a convex structure 15 located on a side of the first alignment layer 14 distal to the first substrate 11. The convex structure 15 covers through holes in the main support region Q21 and the secondary support region Q22 (e.g., the through holes may be in the first alignment layer 14 and overlap with the through holes 121 in the interlayer insulating layer 12, respectively, in a direction perpendicular to the array substrate or the color filter substrate), and the convex structure 15 has filling parts 15a that fill the through holes, respectively (i.e., parts of the convex structure 15 located in the through holes in the first alignment layer 14, respectively). In a plurality of pixel units, convex structures 15 in a same row extend along a direction of the gate lines (i.e., the direction in which the gate lines extend) and have a one-piece structure. That is, the convex structures 15 in a same row form a strip-shaped structure extending along the row direction (i.e., the direction in which the gate lines extend) on a surface of the first alignment layer 14 distal to the first substrate 11.

In some embodiments, a difference between a distance D1 from the surface of the convex structure 15 distal to the first substrate 11 to the first substrate 11 and a distance D2 from the surface of the first alignment layer 14 distal to the first substrate 11 to the first substrate includes, but is not limited to, being between 0.3 μm and 1.3 μm. As such, the convex structure 15 can prevent the first alignment layer 14 from being scratched more effectively, and avoid affecting the orientation of the liquid crystal molecules of the liquid crystal layer 30.

In an embodiment, a material of the convex structure 15 is a resin, which may be acrylic resin. The convex structure 15 made of acrylic resin has mechanical properties such as high surface hardness, good abradability (i.e., good abrasion resistance or abrasive resistance), and the like, and is easy to be manufactured.

Figure 4:
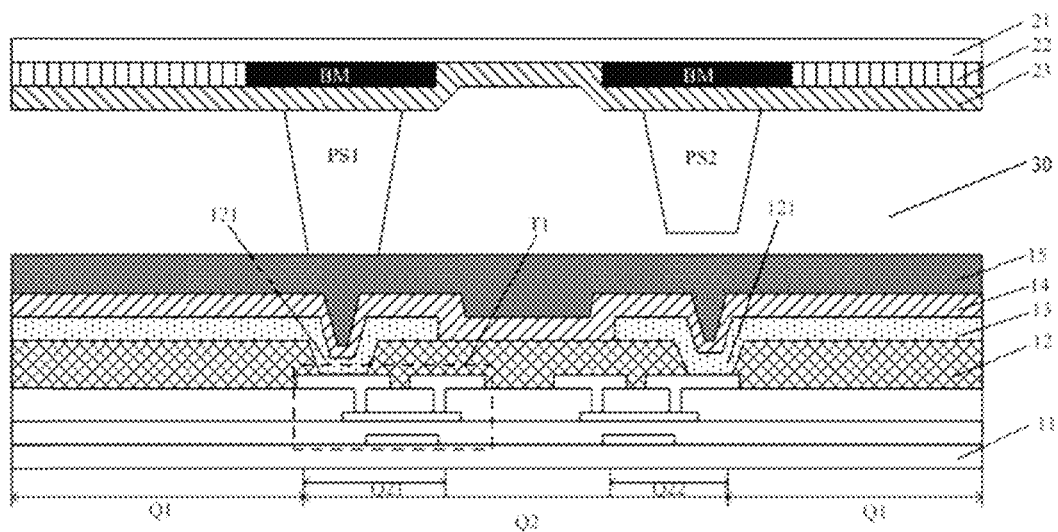
FIG. 4 is a schematic structural view of a part (i.e., two pixels) of a liquid crystal panel including the array substrate shown in FIG. 2.

FIG. 4 schematically illustrates a liquid crystal panel including the array substrate shown in FIG. 2 and a color filter substrate. The main post spacer PS1 and the secondary post spacer PS2 are formed on the color filter substrate, and are located in the main support region Q21 and the secondary support region Q22 of the array substrate, respectively. In other words, in the direction perpendicular to the array substrate or the color filter substrate, the main post spacer PS1 overlaps the main support region Q21, and the secondary post spacer PS2 overlaps the secondary support region Q22. The main post spacers PS1 is in contact with the array substrate, while the secondary post spacers PS2 are spaced apart from the array substrate by a certain distance (i.e., the secondary post spacer PS2 is not in contact with the array substrate). In other words, in the direction perpendicular to the array substrate or the color filter substrate, a size (or dimension) of the main post spacer PS1 is greater than a size (or dimension) of the secondary post spacer PS2. As such, when the liquid crystal panel is subjected to an external force, the main post spacer PS1 may be misaligned, but will not come into contact with the first alignment layer 14 because a certain height difference exists between the convex structure 15 and the first alignment layer 14, thereby preventing the main post spacer PS1 from scratching the first alignment layer 14 effectively. Further, since the convex structure 15 fills the through holes in the first alignment layer 14 of the array substrate, it is possible to avoid a problem that a corner of the main post spacer PS1 falls into the through holes in the first alignment layer 14 and thus the main post spacer PS1 loses its supporting function such that the thickness of the liquid crystal layer 30 cannot be maintained, when the liquid crystal panel is subjected to an external force.

Figure 5:
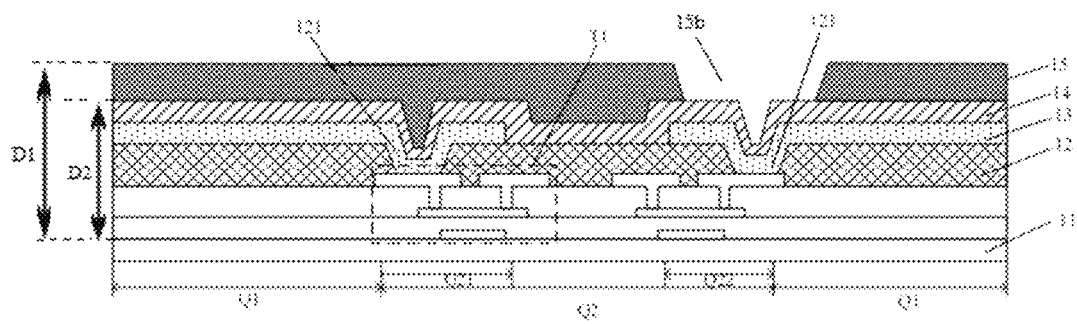
FIG. 5 is a schematic structural view of a part (i.e., two pixels) of another array substrate (i.e., another display substrate) according to an embodiment of the present disclosure.
Figure 6:
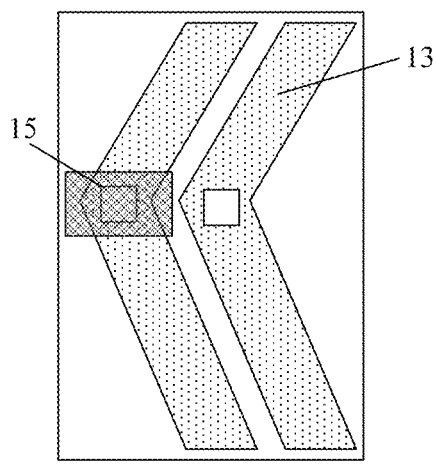
FIG. 6 is a schematic top view of the array substrate shown in FIG. 5.
Figure 7:
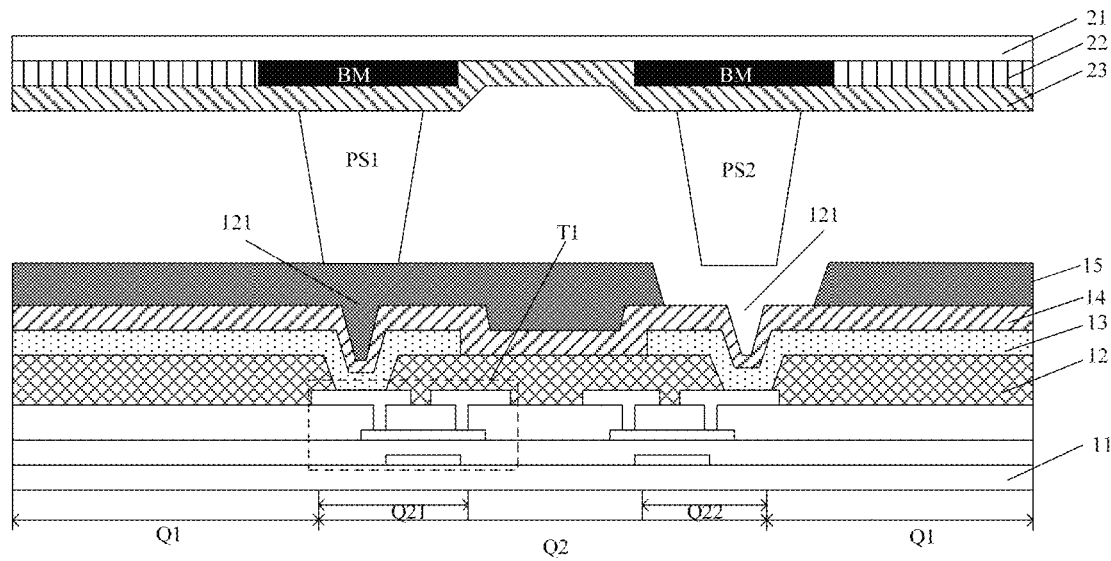
FIG. 7 is a schematic structural view of a part (i.e., two pixels) of a liquid crystal panel including the array substrate shown in FIG. 5.

In another example, as shown in FIGS. 5 and 6, the display substrate is an array substrate having a light-shielding region Q2 and a light-transmissive region Q1. The array substrate may include a first substrate 11, a switching transistor T1 on the first substrate 11 and in the light-shielding region Q2, a pixel electrode 13 on the switching transistor T1 and in the light-transmissive region Q1, a first alignment layer 14 on a side of the pixel electrode 13 distal to the first substrate 11, and an interlayer insulating layer 12 between the switching transistor T1 and the pixel electrode 13. A drain electrode T1d of the switching transistor T1 is connected to the pixel electrode 13 through a through hole 121 penetrating the interlayer insulating layer 12. Each of at least some of light-shielding regions Q2 includes a main support region Q21 and a secondary support region Q22. The convex structure 15 only covers the through hole located in the main support region Q21, i.e. the surface of the convex structure 15 distal to the first alignment layer 14 has a structure including blocks. In other words, there is a gap 15b in the convex structure 15, and the gap 15b divides the convex structure 15 into separate parts. In addition, in the direction perpendicular to the array substrate or the color filter substrate, a size of the main post spacer PS1 may be equal to a size of the secondary post spacer PS2, and an orthogonal projection of the secondary post spacer PS2 on the convex structure 15 is located in the gap 15b, as shown in FIG. 7. As such, it is possible to prevent the secondary post spacer PS2 from scratching the first alignment layer 14.

In some embodiments, a difference between the distance D1 from the surface of the convex structure 15 distal to the first substrate to the first substrate and the distance D2 from the surface of the first alignment layer 14 distal to the first substrate to the first substrate includes, but is not limited to, being between 0.3 μm and 1.3 μm.

FIG. 7 schematically illustrates a liquid crystal panel including the array substrate shown in FIG. 5 and a color filter substrate. The main post spacer PS1 and the secondary post spacer PS2 are formed on the color filter substrate, and are located in the main support region Q21 and the secondary support region Q22 of the array substrate, respectively. The main post spacers PS1 is in contact with the array substrate, while the secondary post spacer PS2 is spaced apart from the array substrate by a certain distance (i.e., the secondary post spacer PS2 does not contact the array substrate). As such, when the liquid crystal panel is subjected to an external force, the main post spacer PS1 may be misaligned, but will not come into contact with the first alignment layer 14 because a certain height difference exists between the convex structure 15 and the first alignment layer 14, thereby preventing the main post spacer PS1 from scratching the first alignment layer 14 effectively. Further, since the convex structure 15 fills a corresponding through hole of the array substrate, it is possible to avoid a problem that a corner of the main post spacer PS1 falls into the corresponding through hole and thus the main post spacer PS1 loses its supporting function such that the thickness of the liquid crystal layer 30 cannot be maintained, when the liquid crystal panel is subjected to an external force. Meanwhile, it can be seen that since the orthogonal projection of the secondary post spacer PS2 on the convex structure 15 is located in the gap 15b between two adjacent parts of the convex structure 15, heights (i.e., sizes (or dimensions) in the direction perpendicular to the array substrate or the color filter substrate) of the main post spacer PS1 and the secondary post spacer PS2 which are formed on the color filter substrate may be equal to each other, which facilitates the manufacturing thereof.

In addition, other structures shown in FIGS. 5 to 7 may be the same as those shown in FIGS. 2 to 4, and description thereof is omitted.

Figure 8:
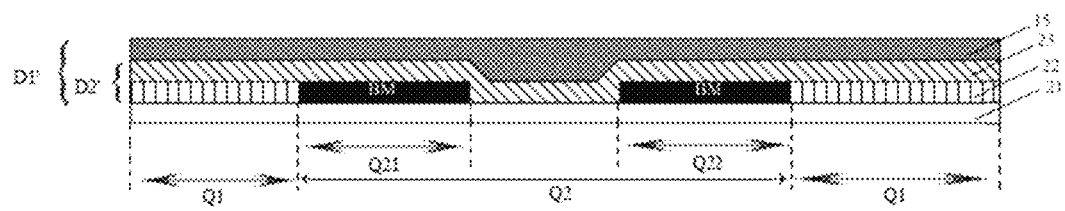
FIG. 8 is a schematic structural diagram of a part (i.e., two pixels) of a color filter substrate (i.e., another display substrate) according to an embodiment of the present disclosure.
Figure 9:
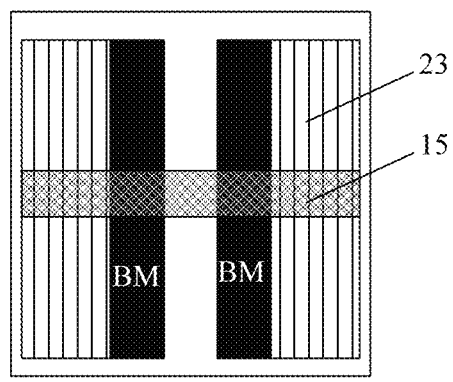
FIG. 9 is a schematic top view of the color filter substrate shown in FIG. 8.

In another example, as shown in FIGS. 8 and 9, the display substrate is a color filter substrate, and the color filter substrate has a light-shielding region Q2 and a light-transmissive region Q1. The color filter substrate may include a second substrate 21, a black matrix BM on the second substrate 21 and located in the light-shielding region Q2, a color filter 22 on the second substrate 21 and located in the light-transmissive region Q1, a second alignment layer 23 on a side, which is distal to the second substrate 21, of a layer where the black matrix BM and the color filter 22 are located, and a convex structure 15 on a side of the second alignment layer 23 distal to the second substrate 21. Each of at least some of light-shielding regions Q2 includes a main support region Q21 and a secondary support region Q22. The convex structures 15 cover the through holes located in the main support region Q21 and the secondary support region Q22, and a plurality of convex structures 15 located in a same row have a one-piece structure. That is, the plurality of convex structures 15 located in a same row form a strip-shaped structure extending along the row direction (i.e., the direction in which the gate lines extend) on the surface of the second alignment layer 23 distal to the second substrate 21.

In some embodiments, a difference between a distance D1' from the surface of the convex structure 15 distal to the second substrate 21 to the second substrate 21 and a distance D2' from the surface of the second alignment layer 23 distal to the second substrate 21 to the second substrate 21 includes, but is not limited to, being between 0.3 μm and 1.3 μm.

Figure 10:
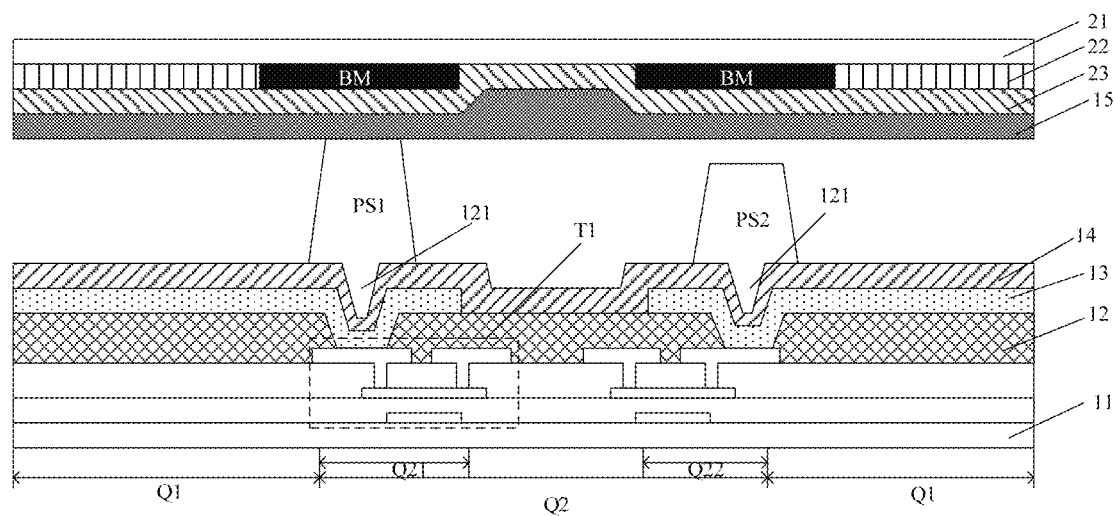
FIG. 10 is a schematic structural diagram of a part (i.e., two pixels) of a liquid crystal panel including the color filter substrate shown in FIG. 8.

FIG. 10 schematically illustrates a liquid crystal panel including the color filter substrate shown in FIG. 8 and an array substrate. The array substrate may include the first substrate 11, the switching transistor T1 located on the first substrate 11 and in the light-shielding region Q2, the pixel electrode 13 located on the first substrate 11 and in the light-transmissive region Q1, the first alignment layer 14 on the side of the pixel electrode 13 distal to the first substrate 11, and the interlayer insulating layer 12 located between the switching transistor T1 and the pixel electrode 13. The drain electrode T1d of the switching transistor T1 is connected to the pixel electrode 13 through a through hole 121 penetrating the interlayer insulating layer 12. The main post spacer PS1 and the secondary post spacer PS2 are arranged on a surface, which is proximal to the color filter substrate, of the array substrate. The main post spacer PS1 and the secondary post spacer PS2 may be disposed on a surface of the first alignment layer 14 of the array substrate distal to the first substrate 11. For example, in the direction perpendicular to the array substrate or the color filter substrate, the main post spacer PS1 is provided in the main support region Q21 corresponding to one through hole, and the secondary post spacer PS2 is provided in the secondary support region Q22 corresponding to another through hole. In other words, in the direction perpendicular to the array substrate or the color filter substrate, an orthogonal projection of the main post spacer PS1 on the interlayer insulating layer 12 overlaps with the one through hole 121, and an orthogonal projection of the secondary post spacer PS2 on the interlayer insulating layer 12 overlaps with the another through hole 121. The main post spacer PS1 is in contact with the convex structure 15 on the color filter substrate, while the secondary post spacer PS2 has a certain distance from the convex structure 15 on the color filter substrate (i.e., the secondary post spacer PS2 is not in contact with the convex structure 15 on the color filter substrate). Therefore, when the liquid crystal panel is subjected to an external force, the main post spacer PS1 may be misaligned, but will not come into contact with the second alignment layer 23 because a certain height difference exists between the convex structure 15 and the second alignment layer 23, thereby preventing the main post spacer PS1 from scratching the second alignment layer 23 effectively.

In FIG. 10, in the direction perpendicular to the array substrate or the color filter substrate, the light-shielding region Q2, the light-transmissive region Q1, the main support region Q21, and the secondary support region Q22 of the color filter substrate may completely overlap the light-shielding region Q2, the light-transmissive region Q1, the main support region Q21, and the secondary support region Q22 of the array substrate, respectively. In addition, in FIG. 10, in the direction perpendicular to the array substrate or the color filter substrate, orthogonal projections of the main post spacer PS1 and the secondary post spacer PS2 on the interlayer insulating layer 12 may completely cover the two through holes 121 in the interlayer insulating layer 12, respectively. As such, it is possible to prevent the main post spacer PS1 and the secondary post spacer PS2 from moving into the through holes which are located in the first alignment layer 14 and respectively overlap the through holes 121, when the display panel is subjected to an external force.

In addition, other structures shown in FIGS. 8 to 10 may be the same as those shown in FIGS. 2 to 4 or may be the same as those shown in FIGS. 5 to 7, and description thereof is omitted.

In some embodiments, the thickness (i.e., the size (or dimension) in the direction perpendicular to the array substrate or the color filter substrate) of the liquid crystal layer 30 is about 1.5 mm. However, the present disclosure is not limited thereto, and for example, the thickness of the liquid crystal layer 30 may be set according to a model and requirements of a specific product.

In a second aspect, as shown in FIGS. 4, 7 and 10, the embodiments of the present disclosure further provide a display panel, which may be, for example, a liquid crystal panel, and may include the display substrate according to any one of the embodiments shown in FIGS. 2, 5 and 8 described above.

The structure of the liquid crystal panel may be that as described above, and description thereof will not be repeated here.

The foregoing embodiments of the present disclosure may be combined with each other in a case of no explicit conflict.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the scope of the present disclosure as defined in the appended claims, and such changes and modifications also fall within the scope of the present disclosure.

What is claimed is:

1. A display substrate, having a light-transmissive region and a light-shielding region, the light-shielding region comprising a main support region and a secondary support region; and
    the display substrate comprising a substrate, an alignment layer on the substrate, and a convex structure on the alignment layer;
    wherein the convex structure is on a side of the alignment layer distal to the substrate, does not completely cover the alignment layer, and is at least in the main support region, and a distance from a surface of the convex structure distal to the substrate to the substrate is greater than a distance from a surface of the alignment layer distal to the substrate to the substrate; and
    wherein a difference between the distance from the surface of the convex structure distal to the substrate to the substrate and the distance from the surface of the alignment layer distal to the substrate to the substrate is between 0.3 µm and 1.3 µm.

2. The display substrate according to claim 1, wherein the main support region and the secondary support region are in two pixels of the display substrate, respectively.

3. The display substrate according to claim 2, wherein the two pixels are adjacent to each other.

4. The display substrate according to claim 2, wherein the two pixels are spaced apart from each other by at least one pixel.

5. The display substrate according to claim 1, wherein the convex structure is in both the main support region and the secondary support region, and convex structures in main support regions and secondary support regions in a same row of a pixel array of the display substrate have a one-piece structure.

6. The display substrate according to claim 1, wherein the display substrate comprises an array substrate.

7. The display substrate according to claim 6, further comprising:
    a switching transistor on the substrate and in the light-shielding region;
    a display electrode on the substrate and in the light-transmissive region; and
    an interlayer insulating layer between the switching transistor and the display electrode, wherein
    a drain electrode of the switching transistor is connected to the display electrode through a through hole penetrating through the interlayer insulating layer;
    the alignment layer is on a side of the display electrode distal to the substrate; and
    the convex structure covers the through hole in the main support region, and has a filling part in the through hole.

8. The display substrate according to claim 6, wherein convex structures in main support regions and secondary support regions in a same row of a pixel array of the display substrate have a one-piece structure.

9. The display substrate according to claim 1, wherein the display substrate comprises a color filter substrate.

10. The display substrate according to claim 1, wherein the convex structure comprises a material of a resin.

11. The display substrate according to claim 10, wherein the resin is acrylic resin.

12. A display panel, comprising the display substrate according to claim 1.

13. The display panel according to claim 12, wherein in a case where the display substrate is an array substrate, the display panel further comprises a color filter substrate;
    the color filter substrate comprises a main post spacer and a secondary post spacer; and
    the main post spacer is in contact with the convex structure in the main support region of the display substrate.

14. The display panel according to claim 13, wherein in a direction perpendicular to the array substrate or the color filter substrate, the main post spacer overlaps the main support region, and the secondary post spacer overlaps the secondary support region.

15. The display panel according to claim 13, wherein in a direction perpendicular to the array substrate or the color filter substrate, a size of the main post spacer is greater than that of the secondary post spacer.

16. The display panel according to claim 13, wherein
    the convex structure of the array substrate has a gap therein, and the gap divides the convex structure into separate parts; and
    in a direction perpendicular to the array substrate or the color filter substrate, a size of the main post spacer is equal to that of the secondary post spacer, and an orthogonal projection of the secondary post spacer on the convex structure is in the gap.

17. The display panel according to claim 12, wherein in a case where the display substrate is a color filter substrate, the display panel further comprises an array substrate, the array substrate comprises a main post spacer and a secondary post spacer, the main post spacer is in contact with the convex structures in the main support region of the display substrate, and the secondary post spacer overlaps the secondary support region of the display substrate.

18. The display panel according to claim 17, wherein
    the array substrate comprises a switching transistor in the light-shielding region, a display electrode in the light-transmissive region, and an interlayer insulating layer between the switching transistor and the display electrode;
    drain electrodes of two switching transistors are respectively connected to two display electrodes through two through holes penetrating through the interlayer insulating layer; and
    in a direction perpendicular to the array substrate or the color filter substrate, orthogonal projections of the main post spacer and the secondary post spacer on the interlayer insulating layer completely cover the two through holes, respectively.

19. The display panel according to claim 12, wherein the display panel is an AR display panel or a VR display panel.

* * * * *